US012547501B2

(12) United States Patent
Bharathan et al.

(10) Patent No.: US 12,547,501 B2
(45) Date of Patent: Feb. 10, 2026

(54) VIRTUAL WAREHOUSE CONFIGURATION ROLLBACK BASED ON QUERY MONITORING

(71) Applicant: Capital One Services, LLC, McLean, VA (US)

(72) Inventors: Ganesh Bharathan, Henrico, VA (US); Hiren Shah, Stafford, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/771,353

(22) Filed: Jul. 12, 2024

(65) Prior Publication Data

US 2026/0017149 A1    Jan. 15, 2026

(51) Int. Cl.
  *G06F 11/14*    (2006.01)
  *G06F 11/1446*    (2026.01)
  *G06F 11/34*    (2006.01)
  *G06F 16/28*    (2019.01)

(52) U.S. Cl.
  CPC ...... *G06F 11/1464* (2013.01); *G06F 11/3409* (2013.01); *G06F 16/283* (2019.01); *G06F 2201/815* (2013.01)

(58) Field of Classification Search
  CPC .............. G06F 11/1464; G06F 16/283; G06F 11/3409; G06F 2201/815
  See application file for complete search history.

(56) References Cited

U.S. PATENT DOCUMENTS

| | | | | |
|---|---|---|---|---|
| 2012/0066554 | A1* | 3/2012 | Ruiz | G06F 9/5027 714/48 |
| 2021/0365461 | A1* | 11/2021 | Allahverdiyev | G06F 16/283 |
| 2022/0222231 | A1* | 7/2022 | Dong | G06N 3/08 |
| 2023/0020782 | A1* | 1/2023 | Kandukuri | G06F 16/256 |
| 2023/0421648 | A1* | 12/2023 | Saride | H04L 67/63 |

* cited by examiner

*Primary Examiner* — Tony Wu
(74) *Attorney, Agent, or Firm* — Banner & Witcoff, Ltd.

(57) ABSTRACT

Methods, systems, and apparatuses for implementing virtual warehouse configuration change rollbacks based on query monitoring. A computing device may identify a history of queries executed by one or more virtual warehouses over time. The computing device may associate each of the queries with a fingerprint, then use those fingerprint(s) to identify one or more similar queries. The computing device may then, based on determining that one or more similar queries are associated with virtual warehouse processing times that satisfy a threshold, perform one or more configuration rollbacks. For example, the computing device may identify one or more previously-made configuration changes and revert those changes by changing operating parameters of the one or more virtual warehouses. For example, size changes of the virtual warehouses may be rolled back, and/or new virtual warehouses may be instantiated to replace previously-terminated virtual warehouses.

20 Claims, 6 Drawing Sheets

Our system detected that the change of VIRTUAL WAREHOUSE 003 from LARGE to MEDIUM is causing queries to be delayed by 30 MINUTES. Would you like to roll back the change? Doing so will potentially incur $100/mo. additional cost.

YES    NO

Notification
(501)

VIRTUAL WAREHOUSE CONFIGURATION ROLLBACK BASED ON QUERY MONITORING

FIELD OF USE

Aspects of the disclosure relate generally to data storage and retrieval. More specifically, aspects of the disclosure relate to managing configuration changes to virtual warehouses which execute queries with respect to a plurality of data warehouses.

BACKGROUND

The Snowflake architecture, produced by Snowflake Inc. of Bozeman, MT, permits organizations to logically separate but natively integrate storage, computing, and services. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. Snowflake and similar "data warehouse as a service" platforms may thereby allow users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

One way in which the Snowflake architecture improves conventional query execution is that Snowflake allows virtual warehouses to be created, modified, and destroyed as desired. For example, an organization might create multiple differently-sized warehouses (e.g., some "Large" sized, some "Medium" sized) for different tasks, might instantiate and/or terminate warehouses at different times (e.g., instantiating virtual warehouses during the workday but terminating them after the workday ends), and the like. This process can present significant cost savings, as the configuration and use of virtual warehouses can incur costs. That said, the ability to control virtual warehouse creation/configuration/termination introduces a trade-off between virtual warehouse computing power and cost. For example, it might be desirable to execute all queries as quickly as possible using "Large"-sized virtual warehouses, but doing so might incur thousands of dollars of unnecessary cost just to execute certain queries only seconds faster than a "Medium"-sized virtual warehouse could perform. It is extremely difficult to ascertain the proper balance between virtual warehouse speed and cost, as queries provided to those virtual warehouses are generally unpredictable, fast-moving, and the particular effect of configuration changes with respect to time (e.g., whether providing an additional virtual warehouse will be sufficiently fast and thereby worth the cost of doing so) can be extremely difficult to measure.

Aspects described herein may address these and other problems, and generally improve the quality, efficiency, and speed of the management of virtual warehouses as those workspaces are tasked with queries.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to implementing virtual warehouse configuration change rollbacks based on query monitoring. A computing device may identify, over a time period, a plurality of queries executed by one or more virtual warehouses. The one or more virtual warehouses may each comprise a respective set of computing resources configured to execute one or more queries with respect to at least a portion of a plurality of data warehouses, collect results from the one or more queries, and/or provide, to a user device, access to the collected results. The computing device may then associate each of the plurality of queries with a fingerprint based on a query type of a corresponding query of the plurality of queries. Then, the computing device may identify a subset of the plurality of queries corresponding to a same fingerprint. Based on determining that the subset of the plurality of queries are associated with virtual warehouse processing times that satisfy a threshold, the computing device may perform various configuration rollbacks. For example, the computing device may identify one or more configuration changes made to the one or more virtual warehouses prior to the time period and revert the one or more configuration changes by changing operating parameters of the one or more virtual warehouses. Such steps may additionally and/or alternatively may be based on determining that a quantity of queries in the subset of the plurality of queries satisfies a second threshold.

All or portions of the changes might be rolled back based on user approval. For example, as part of reverting the one or more configuration changes, the computing device may cause output, on the user device, of a user interface element indicating that the virtual warehouse processing times that satisfy the threshold and receive, from the user interface, user input responding to the user interface element and requesting that the one or more configuration changes be reverted.

Rolling back (e.g., reverting) changes to virtual warehouses may comprise a variety of different changes to those virtual warehouses. For example, such as where a virtual warehouse size was previously changed from a larger size to a smaller size, the computing device may adjust a size of at least one of the one or more virtual warehouses from a smaller size to a larger size. As another example, such as where a virtual warehouse was terminated, the computing device may instantiate a new virtual warehouse based on a configuration of the one or more virtual warehouses.

The threshold for comparing virtual warehouse processing times may be based on a time of day, year, or the like. For example, the computing device may determine the threshold based on a time of year, and the computing device may maintain a plurality of different thresholds corresponding to different times of year.

The virtual warehouse processing times may comprise any performance parameters relating to the performance of virtual warehouses when executing queries. For example, the virtual warehouse processing times may comprise a delay between receipt, of a given query, by a given virtual warehouse and provision, by the virtual warehouse, of results of the given query.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for implementing virtual warehouse configuration change rollbacks based on, for instance, query monitoring. As will be described further herein, a computing device may be configured to monitor queries executed by one or more virtual warehouses over a time period. For instance, the computing device may monitor each query executed by five different virtual warehouses over the course of a week, including how long each query takes one of those virtual warehouses to complete. The computing device may then associate each query with a unique fingerprint. These fingerprints are designed to be unique to the type of query (e.g., queries for particular types of data), but not necessarily the unique parameters of the query. For instance, the query "SELECT*from table ORDER BY firstname" might have the same fingerprint as "SELECT*from table ORDER BY lastname," but both might have a different fingerprint from "SELECT*from table WHERE firstname='John'." These fingerprints might then be used to identify groupings of queries and virtual warehouse processing times for those queries. In turn, where one or more queries are associated with virtual warehouse processing times that satisfy (e.g., exceed, are under) a predetermined threshold, the virtual warehouses might be determined to be operating undesirably slowly, and remedial action might be taken by rolling back (e.g., reverting, undoing) various previously-made changes to the virtual warehouses. For example, if a virtual warehouse was previously shut down, a new virtual warehouse might be instantiated. As another example, size changes to virtual warehouses might be reverted. In this way, changes made to virtual warehouses that cause unnecessary delay (or, as will be described below, improve speed but at unnecessary cost) can be reverted safely.

Conventional virtual warehouse platforms, such as the Snowflake platform by Snowflake Inc. of Bozeman, MT, are presently incapable of performing this rollback process. In general, the complexity of virtual warehouse platforms makes it extremely difficult to determine when, for example, certain virtual warehouses are not properly sized, or when previous changes to virtual warehouses have made them perform more poorly than they did previously. That is particularly the case on a query-by-query level, as nuanced changes in virtual warehouse processing times (e.g., one query taking thirty seconds on a "Medium"-sized virtual warehouse when it previously took fifteen seconds on a "Large"-sized virtual warehouse) are extremely difficult to track and analyze in the aggregate, and because queries (e.g., for particular users or groupings of users in a database) can frequently be executed with different parameters, at different times, and the like. Aspects described herein remedy these and other issues through the use of query monitoring and fingerprinting, by comparing similar queries' virtual warehouse processing times to thresholds (that might be adjusted manually and/or based on time to reflect organizational needs), and by focusing on rolling back changes associated with the virtual warehouse processing times (rather than, e.g., simply making more changes in a random manner).

The present disclosure also improves the functioning of computers by improving the manner in which queries are executed with respect to one or more data warehouses. Virtual warehouses provide an improvement to conventional query systems, but their misconfiguration and misuse can result in the waste of computing resources. For example, if a virtual warehouse is downsized to save money without consideration of the long-term effects of such downsizing, query delays may begin to accumulate, queries might have half the number of nodes to conduct processing, modified execution plans for virtual warehouses may require additional work on the part of fewer computing resources, query timeouts may accumulate, and Extract, Transfer, and Load (ETL) jobs may be run on improperly-sized virtual warehouses causing a ripple effect with respect to virtual warehouses. As such, improvements to the manner in which virtual warehouses are configured (e.g., in terms of size, quantity, processing capabilities, or the like) may make those virtual warehouses more efficient. For example, by right-sizing virtual warehouses in view of the queries actually received by those virtual warehouses, then a delicate balance between the power of virtual warehouses and their corresponding costs may be achieved.

Figure 1:
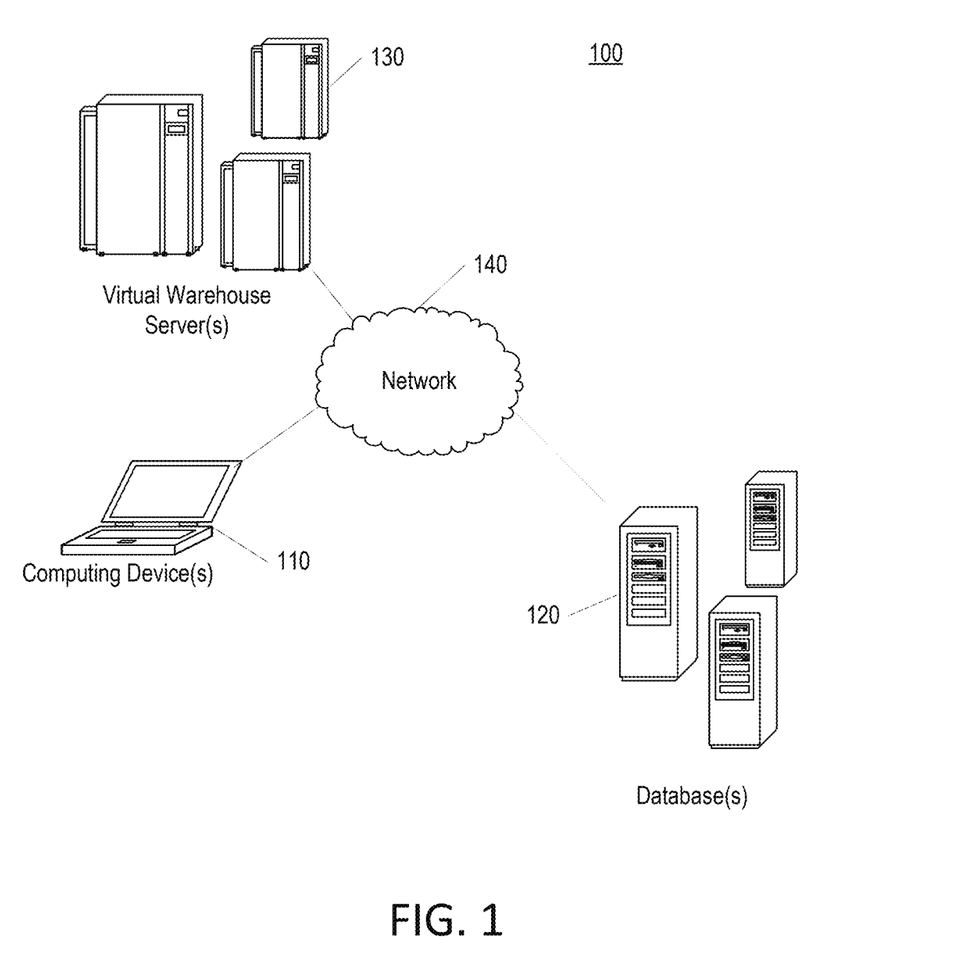
FIG. 1 shows an example of a system in which one or more aspects described herein may be implemented.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 might be located in a first location (e.g., the offices of a corporation), and the virtual warehouse servers 130 and/or the data warehouses 120 might be located in a variety of locations (e.g., distributed in a redundant manner across the globe). This might protect business resources: for example, if the Internet goes down in a first location, the distribution and redundancy of various devices might allow a business to continue operating despite the outage.

The virtual warehouse servers 130 may be all or portions of a virtual warehouse as a service system, such as is provided via the Snowflake architecture. For example, the computing devices 110 and/or the data warehouses 120 might be managed by an organization. In contrast, the virtual warehouse servers 130 might be managed by a different entity, such as Snowflake Inc. In this manner, a third party (e.g., Snowflake) might provide, as a service, virtual warehouses which might operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse might be a single database, a collection of databases, or the like. A data warehouse might be structured and/or unstructured, such that, for example, a data warehouse might comprise a data lake. A data warehouse might store data in a variety of formats and in a variety of manners. For example, a data warehouse might comprise textual data in a table, image data as stored in various file system folders, and the like.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
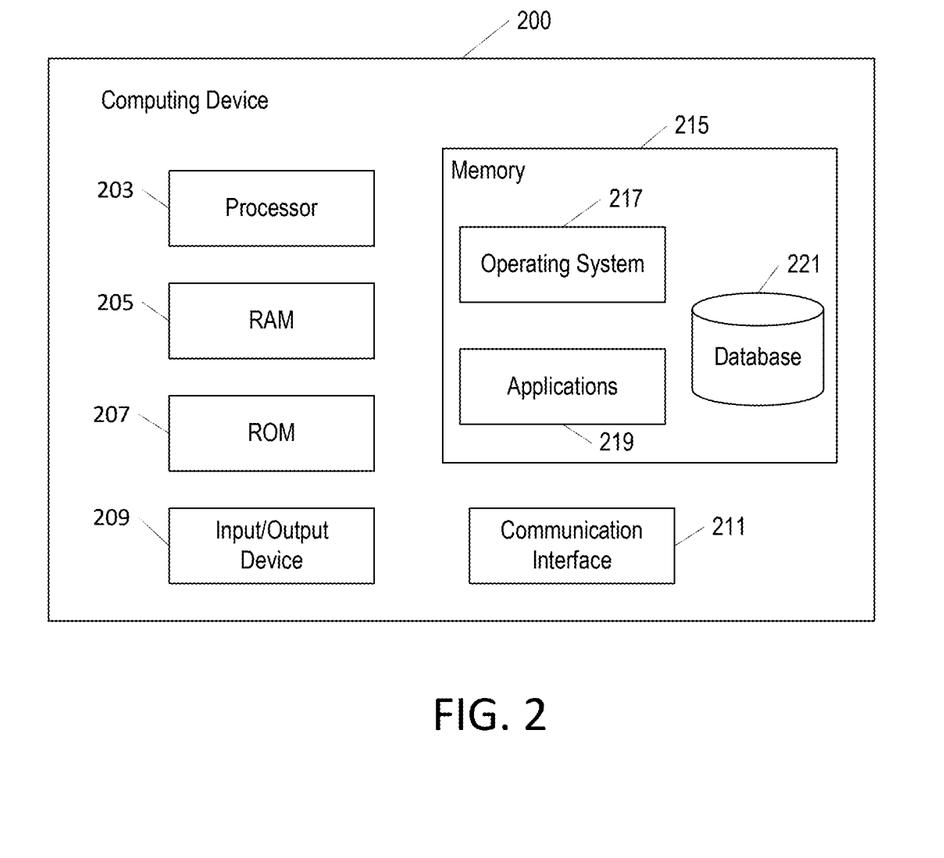
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
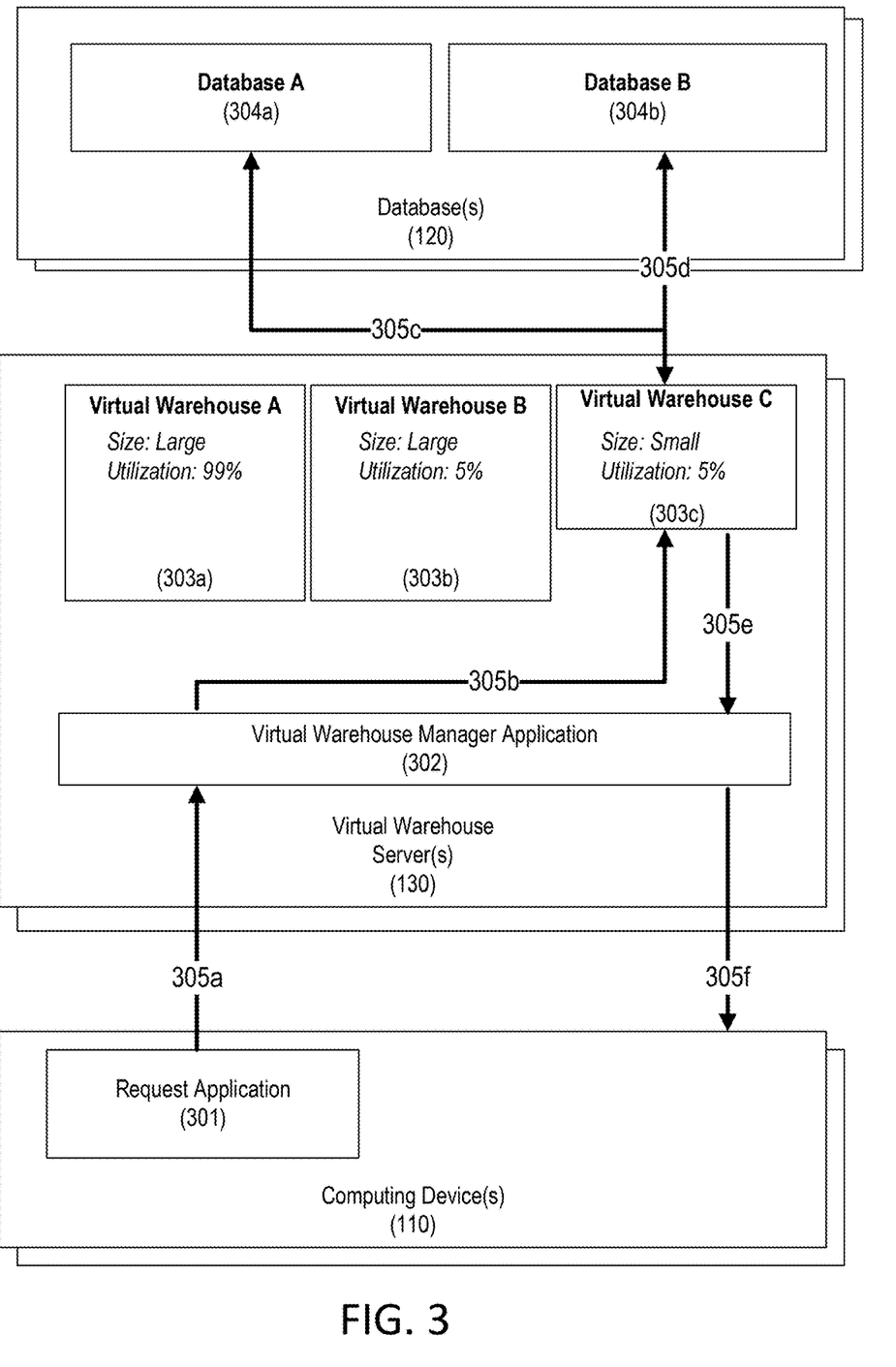
FIG. 3 depicts computing devices, virtual warehouse servers, and data warehouses working in conjunction to execute queries.

FIG. 3 shows a system comprising the computing devices 110, the virtual warehouse servers 130, and the data warehouses 120 of FIG. 1. FIG. 3 may depict all or portions of a system configured according to the Snowflake architecture or a similar architecture permitting use of one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by Snowflake Inc., of Bozeman, MT.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month").

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, or the like.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303*b* and the virtual warehouse C 303*c*, at least because both have a low utilization rate and thus may be capable of handling the request received from the request application 301. From that subset, one or more virtual warehouses may be selected to execute the query. For example, as shown in the example provided in FIG. 3, the virtual warehouse C 303*c* has been selected to address the query. This may be because, for example, the query may be small (that is, the execution plan may be simple or otherwise quick to handle), such that executing the query on the virtual warehouse C 303*c* may be cheaper and may free up the virtual warehouse B 303*b* for handling larger, more complex queries.

Virtual warehouses, such as the virtual warehouse A 303*a*, the virtual warehouse B 303*b*, and/or the virtual warehouse C 303*c*, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Virtual warehouses may be resized such that, for example, the virtual warehouse A 303*a* (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to execute queries, collect results, and provide those results.

Virtual warehouses, such as the virtual warehouse A 303*a*, the virtual warehouse B 303*b*, and/or the virtual warehouse C 303*c*, may be resized based on a schedule. For example, a single virtual warehouse (e.g., the virtual warehouse A 303*a*) might be resized based on a schedule specific to that virtual warehouse (and/or a group of virtual warehouses) such that it is larger during business hours (e.g., 9:00 AM to 5:00 PM) as compared to other hours. Such a schedule might be defined by an administrator, may be based on a use pattern specific to the virtual warehouse, and/or might be based on a pattern of activity, by one or more users, corresponding to one or more different virtual warehouses. For example, the virtual warehouse manager application 302 may monitor use of virtual warehouses and determine that, during business hours, the virtual warehouses are used more frequently. Based on such a determination, the virtual warehouse manager application 302 may configure one or more virtual warehouses with a schedule that causes those one or more virtual warehouses to be larger during business hours and smaller during non-business hours. This might advantageously save money for an organization: by dynamically scaling the size of virtual warehouses, needlessly large (and thereby needlessly expensive) virtual warehouses need not be maintained.

As part of step 305*c* and 305*d*, the selected virtual warehouse (in this case, the virtual warehouse C 303*c*) may execute the query requested by the request application 301. As shown in FIG. 3, this entails querying both the data warehouse A 304*a* and the data warehouse B 304*b*. The data warehouses 120, such as the data warehouse A 304*a* and the data warehouse B 304*b*, need not be the same: for example, the data warehouse A 304*a* may have an entirely different format, may have entirely different schedules which affect their size at any given time, and may have an entirely different structure as compared to the data warehouse B 304*b*. For instance, the data warehouse A 304*a* may comprise a SQL database, whereas the data warehouse B 304*b* may comprise a file server which stores files according to the File Allocation Table (FAT) file system. As part of this process, the virtual warehouse C 303*c* may receive, store, and/or organize results from the data warehouses 120. For example, the virtual warehouse C 303*c* may receive query results from the data warehouse A 304*a* and the data warehouse B 304*b*, may store those results in memory, and then may encrypt those results for security purposes.

As part of step 305*e*, the virtual warehouse C 303*c* provides the collected results to the virtual warehouse manager application 302. Then, as part of step 305*f*, the virtual warehouse manager application 302 provides the results to one or more of the computing devices 110. This process is optional, as the virtual warehouse C 303*c* may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

During any part of the process described above, virtual warehouse processing times may be collected. For example, as a virtual warehouse executes one or more queries, collects results from those one or more queries, and/or provides access to those results, various measurements of time(s) taken to perform those tasks may be measured, collected, and provided to one or more computing devices. In turn, the virtual warehouse processing times may reflect a variety of delay(s) associated with the execution of a query. For example, the virtual warehouse processing times may indicate a delay between receipt, of a given query, by a given virtual warehouse and provision, by the virtual warehouse, of results of the given query. As another example, the virtual warehouse processing times may indicate virtual warehouse utilization rates, the rate (if at all) of failure of queries, or the like.

The steps depicted in FIG. 3 are illustrative, and represent simplified examples of processes which may be performed by the elements depicted in FIG. 3. For example, while step 305*a* is reflected as an arrow directly leading from the request application 301 to one or more of the virtual warehouse servers 130, the request may in fact be routed through various other computing devices as part of the network 140. As another example, the query process reflected in step 305*c* and step 305*d* may involve a plurality of different transmissions between the virtual warehouse C 303*c* and the data warehouses 120.

Discussion will now turn to steps which may be performed from the perspective of a computing device that can implement virtual warehouse configuration change rollbacks. Such a computing device may be any of the computing devices described above, including but not limited to the computing device(s) executing the virtual warehouse manager application 302.

Figure 4:
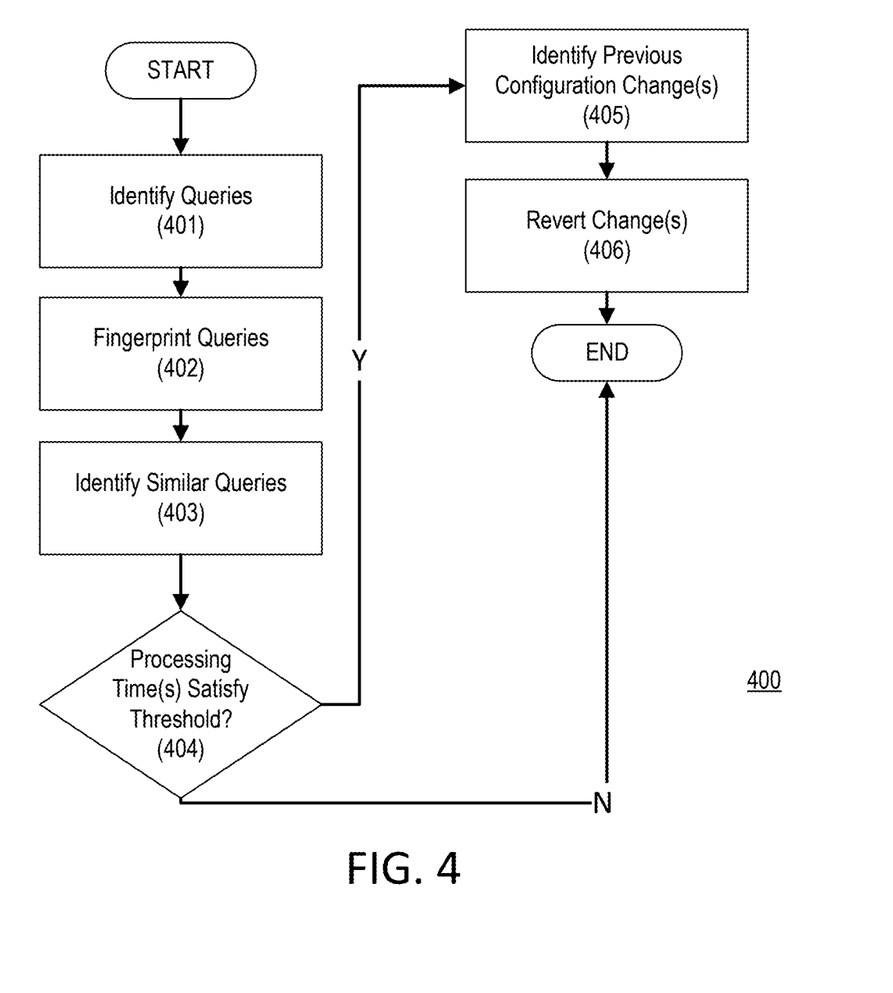
FIG. 4 shows a flow chart which may be performed to implement virtual warehouse configuration change rollbacks.

FIG. 4 depicts a flowchart depicting a method 400 with steps for implementing virtual warehouse configuration change rollbacks based on query monitoring. The steps shown in FIG. 4 may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 4. The steps depicted in FIG. 4 may operate on a Snowflake environment or other virtual warehouse environment, such that they may be performed by a computing device within or external to such an environment. For example, the steps depicted in FIG. 4 may be performed on a user device as part of the user device preparing a query for execution, such that changes need not be made to a preexisting virtual warehouse environment.

In step 401, a computing device may identify queries. This process may involve monitoring queries provided to one or more virtual warehouses by one or more users over a period of time (e.g., four weeks). For example, the computing device may identify, over a time period, a plurality of queries executed by one or more virtual warehouses. To perform this monitoring, the computing device may, for example, store a copy of the text of each query in a database. With that said, because queries might store sensitive information, the stored query information may be obfuscated by, for example, obfuscation of the parameters of a query, the exact time a query was run, or the like. For example, a query "SELECT*FROM cards WHERE cardnum=0123 4567 8910 1234" on June 3 at 9:13 AM might be stored as "SELECT*FROM cards WHERE cardnum=16digit" on June 3 at 9:00 AM. This may be advantageous in no small part because it may make fingerprinting different queries somewhat easier.

In step 402, the computing device may fingerprint the queries identified in step 401. Fingerprinting may be performed to determine rough categorizations of queries in a manner that can allow easy identification of whether certain types of queries (e.g., select queries with certain parameters) have undesirable virtual warehouse processing times. In turn, a fingerprint need not be unique for the exact query, but might instead correspond to a type of query. For example, the computing device may associate each of the plurality of queries with a fingerprint based on a query type of a corresponding query of the plurality of queries.

To provide an example of query fingerprinting, assume for the sake of example that the computing device receives three different queries: "SELECT firstname FROM customer WHERE location='Washington'", "SELECT*FROM customer WHERE age <30", and "SELECT*FROM customer WHERE age >50." In such a circumstance, the first query might be assigned a first fingerprint (e.g., "0AC4"), whereas the second and third query might both be assigned a second, different fingerprint (e.g., "1PSA"). This is because the first query involves selecting a particular column with a single "WHERE" clause, whereas the latter two queries are similar (in that they query for customers in a certain range of ages) despite the fact that the exact parameters (e.g., "30," "50") and the exact comparator (e.g. "<," ">") are different.

Fingerprints may be determined in a variety of ways. In some cases, fingerprints might be determined using a look-up table: a query might be compared to various entries in a look-up table to determine the entry most similar to the query, and a corresponding fingerprint might be assigned based on that comparison. Additionally and/or alternatively, an algorithm might be used. For example, an algorithm might be coded to simplify queries (e.g., "SELECT*FROM customer WHERE age >50") into simplified representations of the query (e.g., "SELECT customer 1 WHERE PARAM"). Other approaches may be used, such as hashing simplified versions of the queries, In step 403, the computing device may determine, using the fingerprint(s), similar queries. This may comprise determining collections of queries that share the same or a similar fingerprint. For example, the computing device may identify a subset of the plurality of queries corresponding to a same fingerprint.

In step 404, the computing device may determine whether processing times associated with the queries satisfy a threshold. This process may comprise determining whether some grouping of queries with the same or a similar fingerprint are associated with virtual warehouse processing times that indicate, for example, undesirably slow processing. For example, the computing device may determine whether the subset of the plurality of queries are associated with virtual warehouse processing times that satisfy a threshold. If the processing times associated with the queries satisfy the threshold, the method 400 proceeds to step 405. Otherwise, the method 400 ends.

While step 404 may often relate to the circumstance wherein virtual warehouses operate too slowly, it is also possible that, as part of determining whether the processing times satisfy a threshold, that the processing times are too fast. If virtual warehouses are misconfigured in a manner that assigns far more processing power than is necessary, then it might be assumed that such configuration is unnecessarily costly. After all, many virtual warehouse systems charge based on (among other considerations) warehouse size and utilization, meaning that underuse of an oversized virtual warehouse can have significant financial consequences. As such, determining whether processing times associated with the queries satisfy a threshold may involve determining whether the processing times are under a threshold.

As indicated previously, the virtual warehouse processing times may relate to any form of time taken, by a virtual warehouse, to execute one or more queries, collect results from those queries, and/or provide access to those results. In turn, the virtual warehouse processing times may indicate a delay between receipt, of a given query, by a given virtual warehouse and provision, by the virtual warehouse, of results of the given query. With that said, the virtual warehouse processing times may indicate some subset of that information, such as the time for a virtual warehouse to complete execution of a query. Additionally and/or alternatively, the virtual warehouse processing times may indicate, for example, whether some queries failed to execute (e.g., due to a timeout).

The threshold referenced in step 404 may vary based on, for example, time. In general, different speeds might be expected at different times of day, different times of week, different times of month, and different times of the year. For example, it may be permissible for queries to run more slowly on off-hours (e.g., after the work day has ended), and it may be more permissible for queries to run slowly during holidays. With that said, thresholds may be more demanding during peak busy times, such as early on in the workday, on Mondays or Fridays (e.g., when many weekly queries might be run), or the like. In turn, the threshold may vary based on time. For instance, the computing device may determine the threshold based on a time of year, wherein the computing device maintains a plurality of different thresholds corresponding to different times of year.

Steps following step 404, such as step 405 and/or step 406, may be contingent on a variety of other determinations, such as whether a sufficient quantity of queries were associated with a virtual warehouse processing time that satisfied a threshold. In turn, the steps may be based on a determination that a quantity of queries in the subset of the plurality of queries satisfies a second threshold. This condition may be particularly important where, for example, a large quantity of queries are run: it may be permissible to allow one query of a thousand to take an undesirably long amount of time to complete if the other queries run sufficiently well (and, e.g., if cost savings are realized).

In step 405, the computing device may identify one or more previous configuration changes. This step may be performed to identify one or more previous configuration changes that might be related to the undesirable virtual warehouse processing times referenced in step 404. For example, based on determining that the subset of the plurality of queries are associated with virtual warehouse processing times that satisfy a threshold, the computing device may identify one or more configuration changes made to the one or more virtual warehouses prior to the time period.

As virtual warehouses might be changed in a variety of ways (and not all of those changes would necessarily lead to the virtual warehouse processing time issues referenced in step 404), the computing device may predict, based on the queries, which change(s) might be rolled back to improve the virtual warehouse processing times. For instance, changes that shrink the size of virtual warehouses are very likely to cause undesirable delay in the processing time of virtual warehouses, meaning that such changes (especially if recent) are likely candidates for reversion. With that said, changes to the name or network location of virtual warehouses might not, without more, cause such delays, particularly in a cloud environment where such changes have minimal processing impact.

To identify one or more previous configuration changes, a log of configuration changes might be processed based on the time when configuration changes were made. As indicated above, the queries may be identified for a particular period of time (e.g., the last week). In turn, the configuration changes affecting the virtual warehouse processing times measured during that period of time may have been made prior to that period of time (e.g., the week before last). For example, if this week's queries are associated with virtual warehouse processing times that are undesirably slow, then a configuration change that was made last week might be at fault, but configuration changes made this week might not necessarily be at fault (as, after all, such changes might have been made after the virtual warehouse processing times were measured).

In step 406, the computing device may revert the identified one or more configuration changes. This step may comprise undoing some or all of the changes identified in step 405. For example, based on determining that the subset of the plurality of queries are associated with virtual warehouse processing times that satisfy a threshold, the computing device may revert the one or more configuration changes by changing operating parameters of the one or more virtual warehouses.

To revert the identified one or more configuration changes, an inverse of the identified one or more configuration changes may be determined. For example, if the identified one or more configuration changes indicate that a virtual warehouse was changed from "Large" to "Small," then the inverse might be changing the same virtual warehouse from "Small" to "Large." As another example, if the identified one or more configuration changes indicate that a virtual warehouse was terminated, then the inverse might be instantiating a new, substantially similar virtual warehouse.

As part of reverting the identified one or more configuration changes, the computing device may be configured to test various rollbacks. Rolling back all previous changes might be overmuch to correct the issues identified with virtual warehouse processing times in step 404. In turn, the computing device may be configured to iterate through the identified one or more configuration changes, testing each to see if it appears to remedy the virtual warehouse processing times. To perform such testing, the computing device may implement at least one of the identified one or more configuration changes, then cause the corresponding virtual warehouse(s) to execute one or more test queries and measure the virtual warehouse processing times corresponding to those one or more test queries.

Reverting the changes may comprise adding, modifying, and/or terminating virtual warehouses. For example, as part of step 406, the computing device may adjust a size of at least one of the one or more virtual warehouses from a smaller size to a larger size. As another example, as part of step 406, the computing device may instantiate a new virtual warehouse based on a configuration of the one or more virtual warehouses.

As part of reverting the configuration changes, a user might be provided the option to implement all or portions of the reversions. Some of the reversions that the computing device may implement may have inherent risks: for example, by reverting a size change to a virtual warehouse, the computing device may increase the costs incurred by an organization significantly. To avoid this issue, one or more users might be provided the option to revert one or more configuration changes. For example, a computing device may cause output, on the user device, of a user interface element indicating that the virtual warehouse processing times that satisfy the threshold, and then receive, from the user interface, user input responding to the user interface element and requesting that the one or more configuration changes be reverted.

Figure 5:
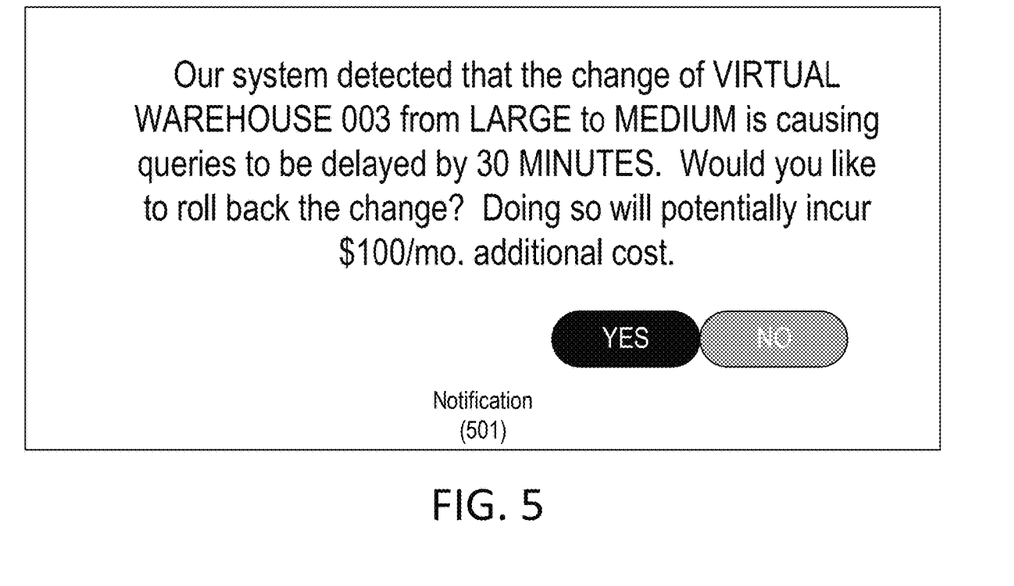
FIG. 5 shows an illustrative notification relating to rollback of a virtual warehouse configuration change.

FIG. 5 depicts a notification 501 that shows an option, provided to a user, to roll back a previous configuration change of a virtual warehouse. As shown in FIG. 5, the notification 501 may indicate the nature of the rollback (e.g., reverting a change of a particular warehouse from a large size to a medium size), including the reason for the rollback (e.g., a thirty-minute query delay) and consequences of the rollback (e.g., $100/mo. additional costs).

Figure 6:
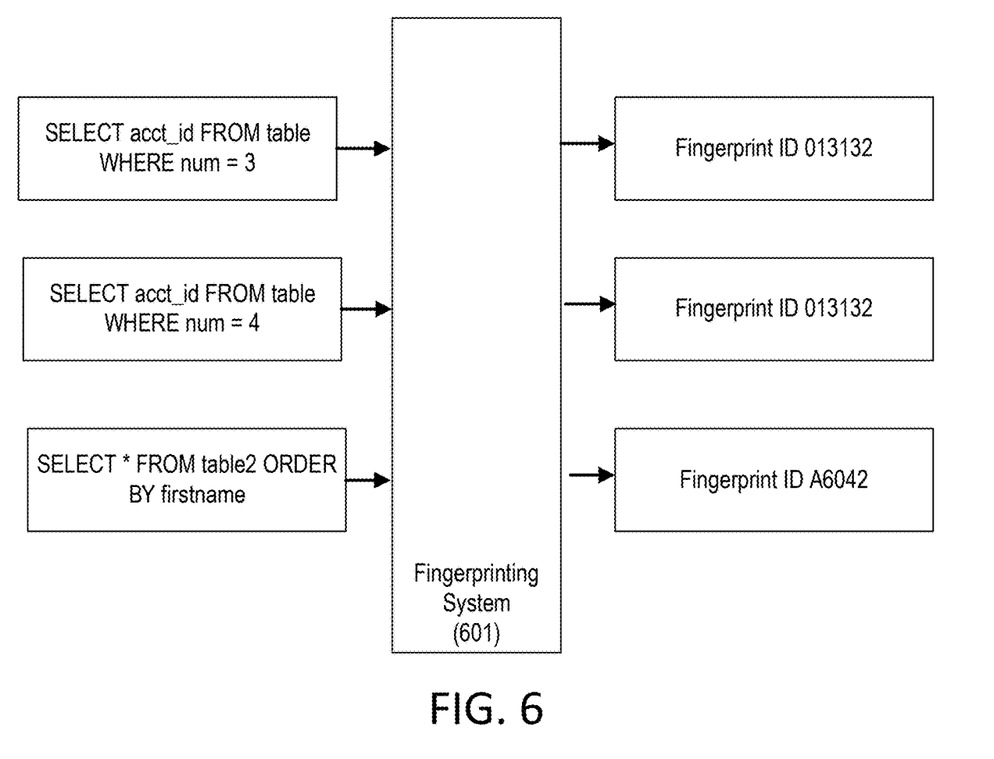
FIG. 6 shows an illustrative fingerprinting system.

FIG. 6 depicts a fingerprinting system 601. The fingerprinting system may comprise an algorithm, lookup table, or similar system configured to generate fingerprints based on queries. As shown in FIG. 6, similar queries (e.g., those with similar query structures but potentially different parameters) may be given the same fingerprint (and thus associated with one another), whereas different queries may be given different fingerprints.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device configured to implement virtual warehouse configuration change rollbacks based on query monitoring, the computing device comprising:
   one or more processors; and
   memory storing instructions that, when executed by the one or more processors, cause the computing device to:
      identify, over a time period, a plurality of queries executed by one or more virtual warehouses, wherein each of the one or more virtual warehouses comprises a respective set of computing resources configured to:
         execute one or more queries with respect to at least a portion of a plurality of data warehouses;
         collect results from the one or more queries; and
         provide, to a user device, access to the collected results;
      associate each of the plurality of queries with a fingerprint by:
         identifying, using one or more clauses directed to one or more columns of a corresponding query of the plurality of queries, a string of a plurality of strings, wherein the string represents a category of queries, and wherein identifying the string comprises using the one or more clauses to query a lookup table comprising the plurality of strings;
      identify a subset of the plurality of queries corresponding to the category of queries based on a determination that the subset of the plurality of queries are associated with a same fingerprint; and
      based on determining that the subset of the plurality of queries are associated with virtual warehouse processing times that satisfy a threshold:
         identify one or more configuration changes made to the one or more virtual warehouses prior to the time period; and
         revert the one or more configuration changes by changing operating parameters of the one or more virtual warehouses.

2. The computing device of claim 1, wherein the instructions, when executed by the one or more processors, cause the computing device to revert the one or more configuration changes by causing the computing device to:
   cause output, on the user device, of a user interface element indicating that the virtual warehouse processing times that satisfy the threshold; and
   receive, from the user interface, user input responding to the user interface element and requesting that the one or more configuration changes be reverted.

3. The computing device of claim 1, wherein the instructions, when executed by the one or more processors, cause the computing device to revert the one or more configuration changes based on determining that a quantity of queries in the subset of the plurality of queries satisfies a second threshold.

4. The computing device of claim 1, wherein the instructions, when executed by the one or more processors, cause the computing device to revert the one or more configuration changes by causing the computing device to:
   adjust a size of at least one of the one or more virtual warehouses from a smaller size to a larger size.

5. The computing device of claim 1, wherein the instructions, when executed by the one or more processors, cause the computing device to revert the one or more configuration changes by causing the computing device to:
   instantiate a new virtual warehouse based on a configuration of the one or more virtual warehouses.

6. The computing device of claim 1, wherein the instructions, when executed by the one or more processors, cause the computing device to:
   determine the threshold based on a time of year, wherein the computing device maintains a plurality of different thresholds corresponding to different times of year.

7. The computing device of claim 1, wherein the virtual warehouse processing times indicate a delay between receipt, of a given query, by a given virtual warehouse and provision, by the virtual warehouse, of results of the given query.

8. A method for implementing virtual warehouse configuration change rollbacks based on query monitoring, the method comprising:
   identifying, by a computing device and over a time period, a plurality of queries executed by one or more virtual warehouses, wherein each of the one or more virtual warehouses comprises a respective set of computing resources configured to:
      execute one or more queries with respect to at least a portion of a plurality of data warehouses;
      collect results from the one or more queries; and
      provide, to a user device, access to the collected results;

associating, by the computing device, each of the plurality of queries with a fingerprint by:
    identifying, using one or more clauses directed to one or more columns of a corresponding query of the plurality of queries, a string of a plurality of strings, wherein the string represents a category of queries, and wherein identifying the string comprises using the one or more clauses to query a lookup table comprising the plurality of strings;
    identifying, by the computing device, a subset of the plurality of queries corresponding to the category of queries based on a determination that the subset of the plurality of queries are associated with a same fingerprint; and
    based on determining that the subset of the plurality of queries are associated with virtual warehouse processing times that satisfy a threshold:
        identifying, by the computing device, one or more configuration changes made to the one or more virtual warehouses prior to the time period; and
        reverting, by the computing device, the one or more configuration changes by changing operating parameters of the one or more virtual warehouses.

9. The method of claim 8, wherein the reverting the one or more configuration changes comprises:
    causing output, on the user device, of a user interface element indicating that the virtual warehouse processing times that satisfy the threshold; and
    receiving, from the user interface, user input responding to the user interface element and requesting that the one or more configuration changes be reverted.

10. The method of claim 8, wherein the reverting the one or more configuration changes is further based on determining that a quantity of queries in the subset of the plurality of queries satisfies a second threshold.

11. The method of claim 8, wherein the reverting the one or more configuration changes comprises:
    adjusting a size of at least one of the one or more virtual warehouses from a smaller size to a larger size.

12. The method of claim 8, wherein the reverting the one or more configuration changes comprises:
    instantiating a new virtual warehouse based on a configuration of the one or more virtual warehouses.

13. The method of claim 8, further comprising:
    determining the threshold based on a time of year, wherein the computing device maintains a plurality of different thresholds corresponding to different times of year.

14. The method of claim 8, wherein the virtual warehouse processing times indicate a delay between receipt, of a given query, by a given virtual warehouse and provision, by the virtual warehouse, of results of the given query.

15. One or more non-transitory computer-readable media storing instructions that, when executed by one or more processors of a computing device, cause the computing device to:
    identify, over a time period, a plurality of queries executed by one or more virtual warehouses, wherein each of the one or more virtual warehouses comprises a respective set of computing resources configured to:
        execute one or more queries with respect to at least a portion of a plurality of data warehouses;
        collect results from the one or more queries; and
        provide, to a user device, access to the collected results;
    associate each of the plurality of queries with a fingerprint by:
        identifying, using one or more clauses directed to one or more columns of a corresponding query of the plurality of queries, a string of a plurality of strings, wherein the string represents a category of queries, and wherein identifying the string comprises using the one or more clauses to query a lookup table comprising the plurality of strings;
    identify a subset of the plurality of queries corresponding to the category of queries based on a determination that the subset of the plurality of queries are associated with a same fingerprint; and
    based on determining that the subset of the plurality of queries are associated with virtual warehouse processing times that satisfy a threshold:
        identify one or more configuration changes made to the one or more virtual warehouses prior to the time period; and
        revert the one or more configuration changes by changing operating parameters of the one or more virtual warehouses.

16. The one or more non-transitory computer-readable media of claim 15, wherein the instructions, when executed by the one or more processors, cause the computing device to revert the one or more configuration changes by causing the computing device to:
    cause output, on the user device, of a user interface element indicating that the virtual warehouse processing times that satisfy the threshold; and
    receive, from the user interface, user input responding to the user interface element and requesting that the one or more configuration changes be reverted.

17. The one or more non-transitory computer-readable media of claim 15, wherein the instructions, when executed by the one or more processors, cause the computing device to revert the one or more configuration changes based on determining that a quantity of queries in the subset of the plurality of queries satisfies a second threshold.

18. The one or more non-transitory computer-readable media of claim 15, wherein the instructions, when executed by the one or more processors, cause the computing device to revert the one or more configuration changes by causing the computing device to:
    adjust a size of at least one of the one or more virtual warehouses from a smaller size to a larger size.

19. The one or more non-transitory computer-readable media of claim 15, wherein the instructions, when executed by the one or more processors, cause the computing device to revert the one or more configuration changes by causing the computing device to:
    instantiate a new virtual warehouse based on a configuration of the one or more virtual warehouses.

20. The one or more non-transitory computer-readable media of claim 15, wherein the instructions, when executed by the one or more processors, cause the computing device to:
    determine the threshold based on a time of year, wherein the computing device maintains a plurality of different thresholds corresponding to different times of year.

* * * * *